United States Patent [19]
Rising

[11] Patent Number: 5,560,319
[45] Date of Patent: Oct. 1, 1996

[54] PLAY TOY FOR ANIMALS

[76] Inventor: Alice M. Rising, P.O. Box 292, Pineville, Pa. 18946

[21] Appl. No.: 405,698

[22] Filed: Mar. 17, 1995

[51] Int. Cl.$^6$ ....................................................... A01K 29/00
[52] U.S. Cl. ............................................................. 119/709
[58] Field of Search ................................... 119/702, 707, 119/709, 710, 711; 5/466, 636, 644, 648; 446/369, 370, 371

[56] References Cited

U.S. PATENT DOCUMENTS

| | | | |
|---|---|---|---|
| 745,806 | 12/1903 | Erb, Jr. .................................... | 119/707 |
| 1,644,317 | 10/1927 | Willey ....................................... | 446/369 |
| 1,659,720 | 2/1928 | Cate ........................................ | 446/369 |
| 4,321,888 | 3/1982 | Topliffe ................................... | 119/709 |

*Primary Examiner*—Thomas Price
*Attorney, Agent, or Firm*—John J. Simkanich

[57] ABSTRACT

A play toy for animals is provided of reasonable weight and size to be handled by the animal for which it was designed. The toy is of any of a number of regular and irregular shapes, including rectangles and squares, having a plurality of tabs or other members intended to be grasped by and held in the animal's mouth. The toy's configuration is non-rigid, pliable, and safe to the animal by which it is intended. The structure contains a filling which forms a soft pillow or cushion like structure from which the tab members extend. A covering holds the filling and forms the outside surface of the toy. This covering is of a pliable, non-abrasive, and strong material which will greatly resist tearing and which is tough enough to withstand continuing use by the animal. The filling material is of a non-toxic, non-harmful nature, and is selected from a class of materials which will not injure the animal if ingested or inhaled.

16 Claims, 3 Drawing Sheets

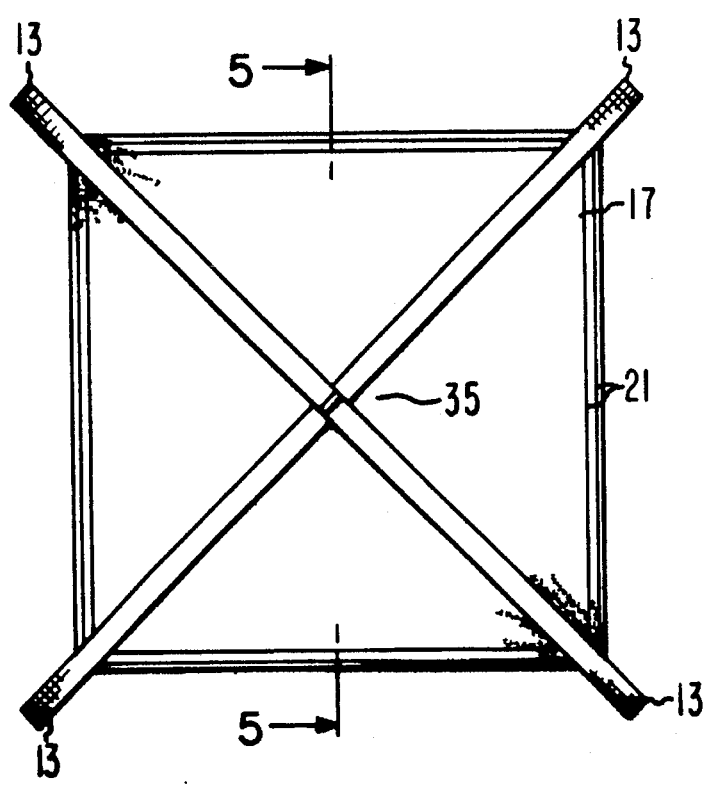
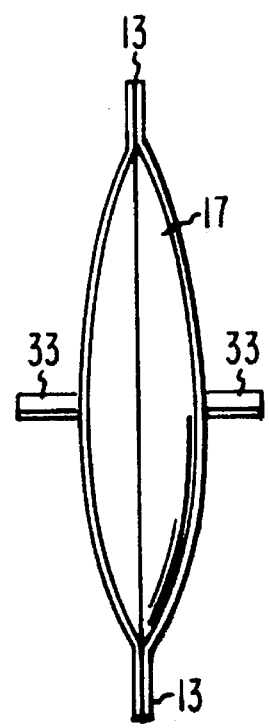
Fig. 3            Fig. 4
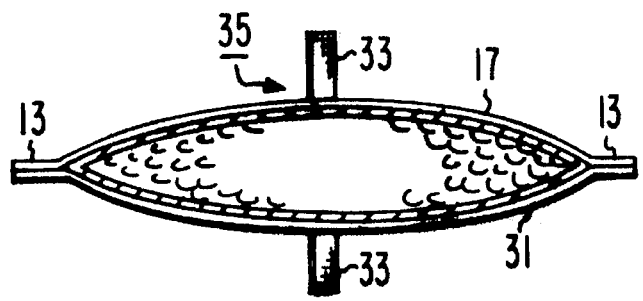
Fig. 5
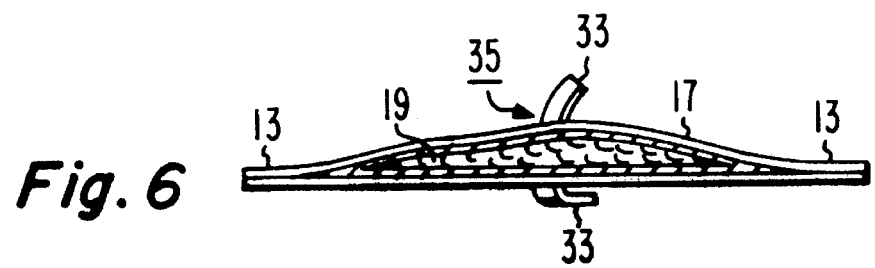
Fig. 6

PLAY TOY FOR ANIMALS

BACKGROUND OF THE INVENTION

The present invention is directed to a play toy for an animal, and in particular, to such a toy for both a young and a mature horse and other animals which is safe for its use. Applicant has processed Disclosure Document Deposits recorded by the U.S. Patent Office as number 367878.

Many hoofed and pawed animals, such as horses, dogs and cats enjoy play things. Almost universally these play things, or toys, are designed for the animal to pick up and hold in its mouth, or to push with its nose or feet (hoofs, paws). These prior animal play toys have been designed to occupy the animals in some sort of activity, such a chewing, gnawing, or butting and pushing. Most are also designed to look appealing to the animal's owner.

Usually these prior toys are designed to be durable, i.e. to be tough enough to not be easily destroyed or broken by the animal. This durability has manifested itself in a generally rigid or semi-rigid object made from metal, wood, tough rubber compounds or tough plastic compounds. In addition, these prior toys often provide a grasping surface which universally has been embodied as a closed loop or narrowed, round rod-shaped, section. An example of a horse toy of this design is a tough rubber coated ball, of a size between a volley ball and a basket ball, with a rigid protruding grasping loop. This grasping loop is made from a rod projecting from the surface of the ball and attached at both ends.

Many of these toys, including this ball toy are awkward and too heavy for young horses to safely handle. Moreover, as the projecting closed loop is made large enough for the horse to grasp in its mouth, it is often, also, large enough for the young horse to trip on. Its opening is also large enough for the horse to get its hoof caught in, or to injure its leg.

Stuffed toys, such as stuffed human-looking dolls, and dog-like or cat-like dolls, have been used as small animal play toys. These stuffed toys are unsuitable for larger animals, such as horses. They are not durable enough, nor do they provide a proper grasping surface for the animal. A young, or even an older horse can gag on many of the appendages of such doll-like toys. However, stuffed toys are soft and pliable and usually cannot cause injury when stepped on, unless they create a tripping hazard.

It is desirable to provide an improved animal toy, which is durable and which is soft and pliable so a not to cause injury when stepped on or tossed about. It is also desirable to provide such a toy which presents grasping appendages of a size and shape to be easily grasped in the animal's mouth without allowing a horse to gag. It is further desirable to provide such a toy which is safe and non-toxic to the animal if it is broken or torn apart.

SUMMARY OF THE INVENTION

An objective of the present invention is to provide a play toy for animals, such as a horse, which is safe for it to use and which does not present any sharp or hard protrusions.

A second objective of the invention is to provide such a play toy which includes a soft and pliable body and a plurality of soft protrusions by which the animal can grasp and carry the toy in its mouth.

A further objective of the invention is to provide such a toy which is durable under normal use and which if punctured or broken does not present a toxic condition to the animal.

These objectives are realized in an animal toy having a pillow-like or cushion-like body and a plurality of soft and pliable tabs projecting therefrom. The body of the toy has a covering of tough but pliable material which is tear resistant and cut resistant. A filling material is contained within the body in sufficient quantity to give some bulk to the body, but yet may allow the body to fall limply when held or carried by the animal. The body size, the tabs size and the amount of filling material may be modified for the age and size of the animal, as well as for the type animal for which the toy is intended.

The tabs are connected to the body in a reinforced configuration so as to naturally stand out from the body surface. The filling material is of a non-toxic type, if ingested or inhaled.

DESCRIPTION OF THE DRAWINGS

The features, advantages and operation of the animal toy of the present invention will become readily apparent and further understood from a reading of the following detailed description with the accompanying drawings, in which like numerals refer to like elements, and in which:

FIG. 3 is a top view of the toy shown in FIG. 2;

FIG. 4 is a side view of the toy shown in FIG. 3;

FIG. 5 is a crossectional view of the toy, taken as shown in FIG. 3;

FIG. 6 is a crossectional view of the toy of FIG. 5, taken as shown in FIG. 3, but with less filling material;

DETAILED DESCRIPTION OF THE INVENTION

Figure 1:
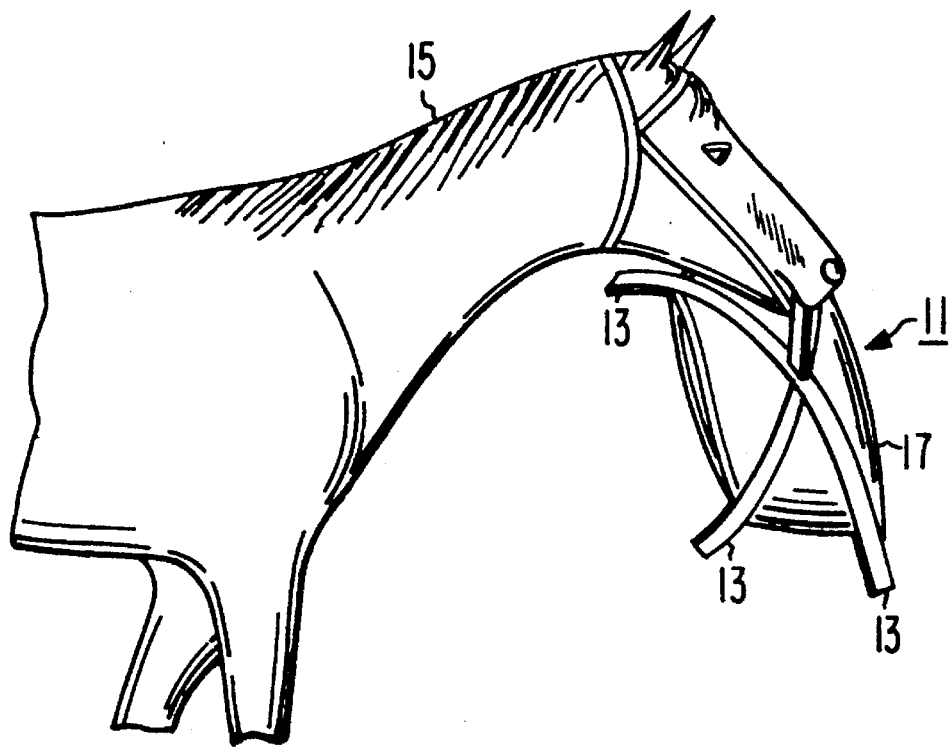
FIG. 1 is a side view of a horse holding the play toy invention.

The present invention is a pillow-shaped or cushion-shaped animal play toy 11, FIG. 1, having a plurality of teething tabs 13 by which an animal, such as a horse 15, can grasp and carry the toy 11. The configuration of the body 17 of the toy 11 is such that it can hang limp when grasped by the horse 15.

Figure 2:
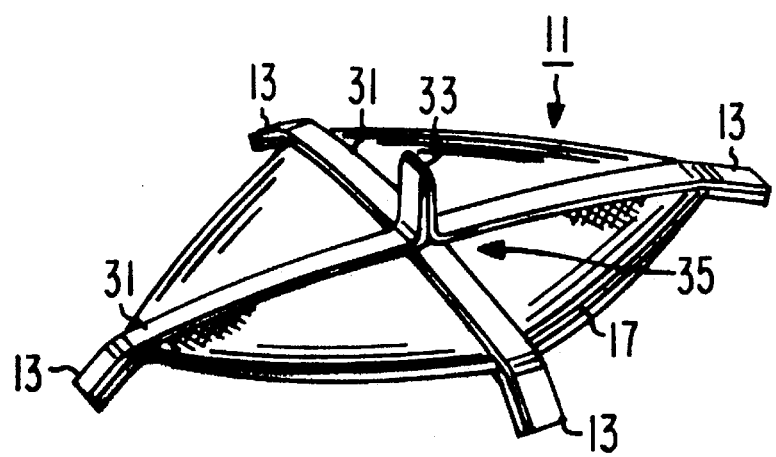
FIG. 2 is a perspective view of the play toy invention.

The body 17 has a square profile, FIG. 2, with a covering of tough material, such as DuPont "CORDURA" nylon, having an integral water resistant backing. The weight of the covering can be in the range of 4 to 7 ounce material for a play toy 11 intended for horses. This weight of the covering material will affect the overall weight of the toy 11 and the strength of the covering, including its resistance to tears and cuts.

The body 17, contains filling material 19, FIGS. 5 and 6. When the body 17 is fully packed with filling material 19, it will have a full or rounded profile, FIGS. 4 and 5. If less filling 19 is used, the body 17 will be more limp, FIGS. 2 and 6. The amount of filling material 19 use will affect the overall weight of the toy 11. This filling material 19 is cedar wood shavings or "curls". This material will not harm the animal if ingested. It is also the type of material which is not easily inhaled.

The body 17 is made of two layers of the covering material which are sewn, double stitched 21 along each peripheral edge. This double stitching 21 contributes to making that portion of the body 17 along its edges more rigid, in order to withstand the stress of being clasped in the mouth of the animal or buffeted about. The double stitching creates a peripheral reinforced grasping edge. This double stitching 21 is used when the toy 11 has a rectangular profile body 23, FIG. 7, a circular or round profile body 25, FIG. 8, a tubular shaped body 27, FIG. 9, or a triangular profile body 29, FIG. 10.

A webbing 31 is sewed across each face of the material covering of the body 17, FIGS. 2, 3 and 4. This webbing is sewed on each face in a crossed leg fashion. It provides further reinforcement or stiffening to hold the shape of the square profile body 17. The webbing 31 is braided flat nylon webbing having a tensile strength in the range of from 1,000 to 10,000 pounds per square inch. The webbing 31 extends beyond the edges of the body 17 to form a plurality of double thickness edge tabs 13. An orthogonally extending outward projecting tab 33 also extends from each opposing covering face of the body 17 at the web overlap position 35 in the center of each face.

The orthogonally outwardly projecting tabs 33 enhance the probability that at least one of the tabs 13, 33 will be upward standing regardless of how the toy 11 is laying. Each of these tabs 13, 33 provides a rectangular, flat gripping object for the horse or other animal to mouth and grip with its teeth. In combination the tabs 13, 33 extend in each of the "x", "y" and "z" directions (vector axis directions). The size of each of these tabs 13, 33 is the same. The tabs 13, 33 and the face of the body 17 simulate a pacifier structure to a young horse and a curiosity structure to an older animal. The tabs 13, 33 are flexible, tough and safe protrusions by which the toy 11 can be grasped, tossed about and played with. When the body 17 is loosely packed with the cedar shavings filing 19, its limpness allows for changes in the contour of the toy 11 as is folds and crushes in upon itself. This adds to the animals attraction to and preoccupation with of the toy 11.

The toy 11 when made in the other profiles shown in FIGS. 7–10 is made of similar weight and size with similar dimensions and strength, as the square shape shown in FIGS. 2–6. The square shaped toy 11 is about 21 inches on a side and about 4 to 6 inches thick at its central thickest dimension. The toy 11 contains about three-quarters to one and one-quarter pounds of cedar filling 19. Cover and webbing weigh about 4 to 8 ounces.

When made for foal or weanling, the dimensions are about 14 to 16 inches on a side, about 3 to 4 inches thick at its thickest, and weighing about one-third to five-eighths pounds.

The tabs 13, 33 are each 2 inches wide and 4 inches long. These dimensions of the tabs are the same for the smaller animals. The size of a tab will allow it to be drawn a substantial distance into the animals mouth for the animal to grab it, teeth it and even suck on it. However, a tab is not big enough to gag the animal.

The facing of the webbing, being sewn double thickness, combined with the flex features of the "CORDURA" nylon keep the body of the toy from being drawn any substantial distance into an animal's mouth.

Normally the double stitching is made about one-half to three-quarter inch from the extreme edge of the body 17. This provides about a three-quarter inch wide reinforced edge for the animal to grasp. The width of this stitched band about the periphery of the body can me made wider for animals that may want to carry the toy by the edge.

Figure 7:
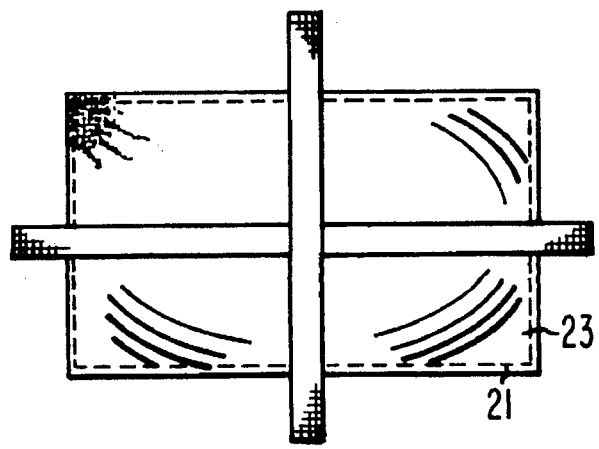
FIG. 7 is a top or plan view of the toy in a rectangular profile shape.
Figure 8:
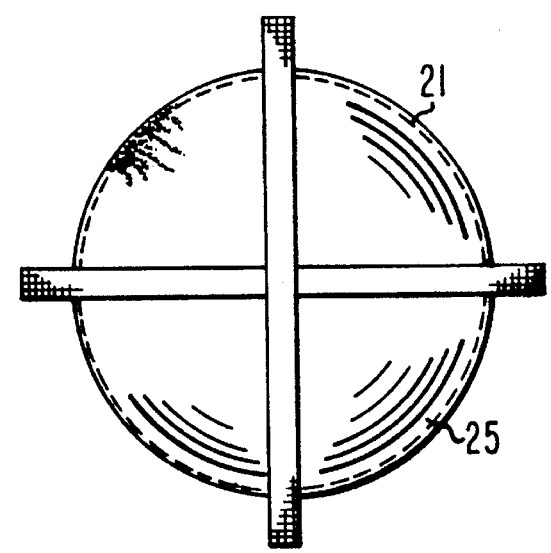
FIG. 8 is a top or plan view of the toy in a round or circular profile shape.
Figure 10:
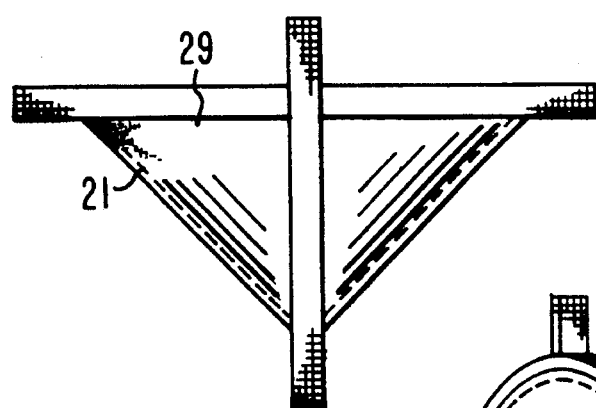
FIG. 10 is a top or plan view of the toy in a triangular shape.
Figure 9:
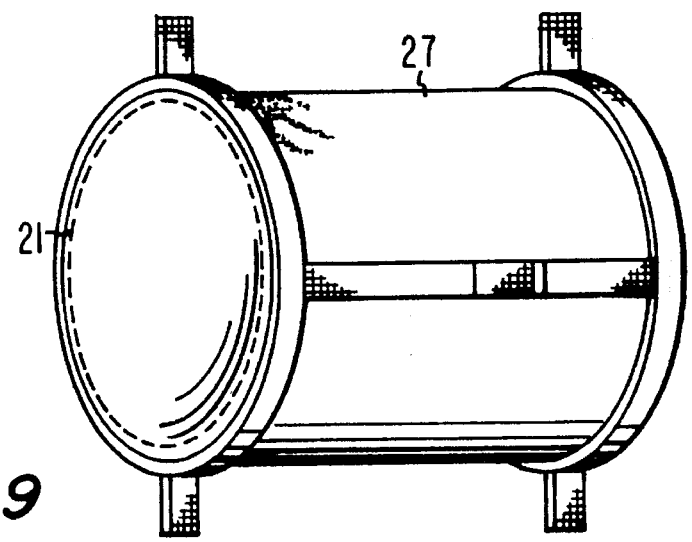
FIG. 9 is a perspective view of the toy in a cylindrical shape.

When the toys 11 shown in FIGS. 7–10 are sized for a horse, the rectangular pillow shown in FIG. 7 is about 21 by 12 inches; the circular pillow shown in FIG. 8 is about 18 inches in diameter; the cylindrical pillow shown in FIG. 9 is about 18 inches in diameter and 18 inches long; and the triangular pillow shown in FIG. 10 is about 12 inches on each side and 20 inches on its bottom of longest side.

Many changes can be made in the above-described invention without departing from the intent and scope thereof. The shape can change. Size, weight, tab dimensions, and thickness can be changed to suit the animal application. It is thereby intended that the above description be read in the illustrative sense and not in the limiting sense.

What is claimed is:

1. A play toy for an animal, comprising:
    a pliable body having a tough, durable covering, said body being soft pillow-like in structure with two opposing covering faces joined to form peripheral edges thereof;
    a plurality of reinforcement members attached to said durable covering and extending across each said opposing face thereof to support the integrity of the shape of said body; and
    a plurality of tabs extending outwardly from the edges of said body and additional tabs extending orthogonally outwardly from said opposing faces of said body, said tabs being sized to be grasped to fit safely into the mouth of the animal for which the play toy is intended.

2. The play toy of claim 1 also including a non toxic filling material contained within said body covering.

3. The play toy of claim 2 wherein said two opposing covering faces are bound together about the periphery of the covering faces thereby providing a peripheral reinforced grasping edge thereabout.

4. The play toy of claim 3 wherein said tabs extend from said reinforcement members, whereof said reinforcement members limit the depth of insertion of a tab into an animal's mouth.

5. The play toy of claim 4 wherein said tabs are made from said reinforcement members and contiguous therewith.

6. The play toy of claim 5 wherein said filling material completely fills the covering thereby causing each of said plural tabs to stand almost fully outwardly.

7. The play toy of claim 5 wherein said filling material partially fills said body allowing said body to fall limply.

8. The play toy of claim 5 wherein said opposing covering faces are of tare and cut resistant material.

9. The play toy of claim 8 wherein said opposing covering faces is of nylon material.

10. The play toy of claim 9 wherein said filling is chosen from the group of: cedar shavings and cedar curls.

11. The play toy of claim 9 wherein said reinforcement members are of nylon webbing, and wherein said edge tabs and said orthogonally extending tabs are also of nylon webbing.

12. The play toy of claim 11 wherein said edge tabs and said orthogonally extending tabs are of nylon webbing, double layered.

13. The play toy of claim 12 wherein said body has a profile shape chosen from the group: square, rectangle, circle, triangle and cylinder.

14. The play toy of claim 13 wherein said body is a square about 21 inches on a side; wherein said nylon webbing is about two inches wide; wherein said edge tabs and said orthogonal tabs are about 4 inches long; wherein said webbing is about ⅛ inches thick when doubled; and wherein said filling weighs from about one-half to about one pounds.

15. The play toy of claim 13 wherein said reinforcement webbing crosses on each opposing covering face; wherein said edge tabs extend outwardly from the location where opposing face webbing reaches an edge; and wherein said orthogonal tabs extend outwardly from the location where said webbing crosses on each said opposing face.

16. A play toy for a horse, comprising:

- a body covered with opposing faces of tough, tear resistant nylon material, said opposing material faces being sewn about its edges to form an enclosure;
- a filling of non-toxic material contained within said body enclosure, said filling material being of a plurality of individual components amassed into the sum of said filling bulk;
- a plurality of animal mouth graspable projections extending from said body along "x", "y" and "z" axes; and
- wherein said filling material creates a soft and pliable body of said toy.

* * * * *